July 18, 1961
R. H. ECKENBACH
2,992,625
SYSTEMS AND STRUCTURES FOR STORING AND
UTILIZING INFORMATION, DATA, ETC.
Filed Aug. 26, 1958
3 Sheets-Sheet 1
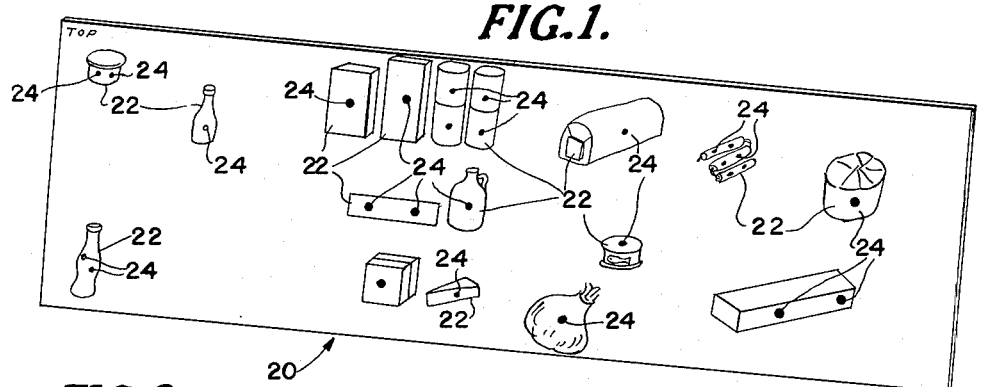
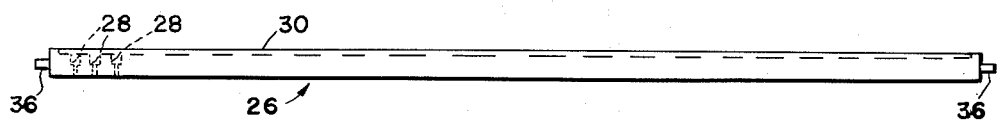
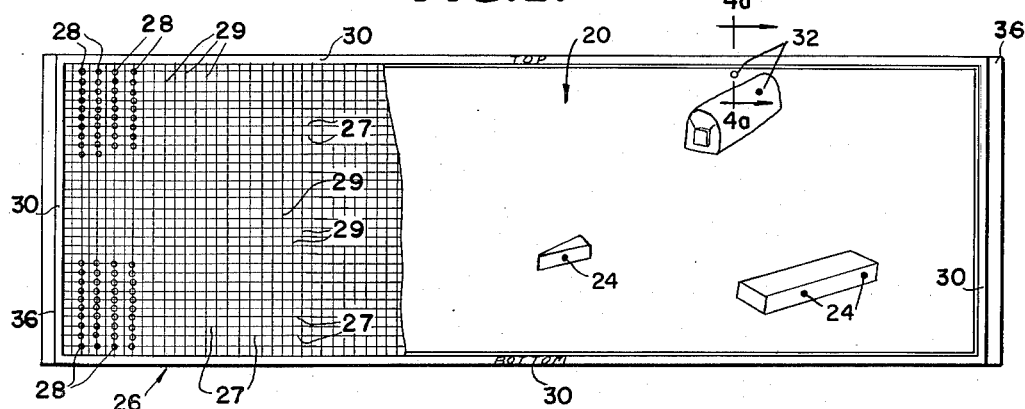
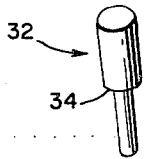
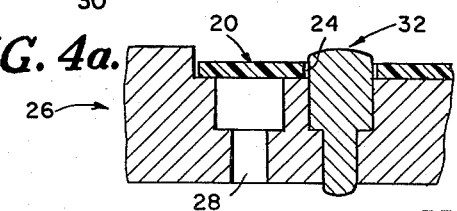
INVENTOR
RAYMOND H. ECKENBACH
BY Cushman, Darby & Cushman
ATTORNEYS July 18, 1961
R. H. ECKENBACH
2,992,625
SYSTEMS AND STRUCTURES FOR STORING AND
UTILIZING INFORMATION, DATA, ETC.
Filed Aug. 26, 1958
3 Sheets-Sheet 2
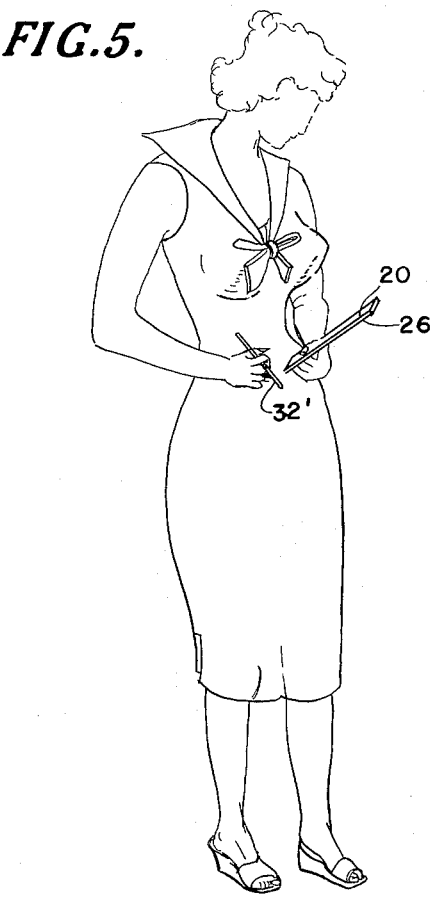
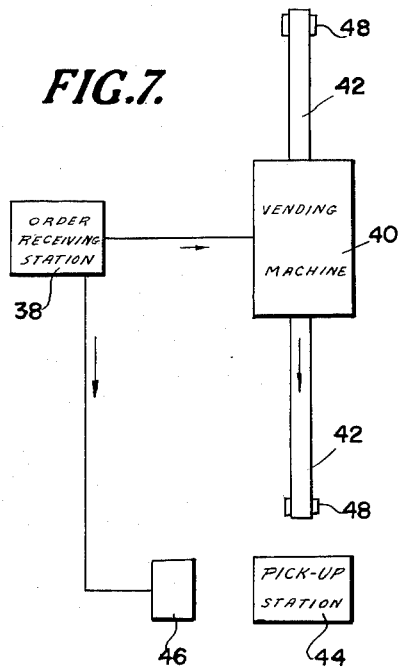
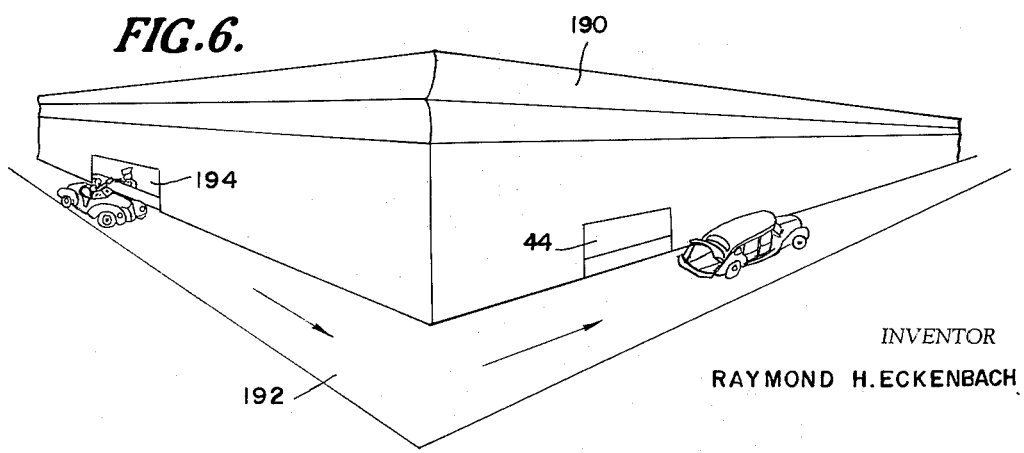
INVENTOR
RAYMOND H. ECKENBACH
BY Cushman, Darby & Cushman
ATTORNEYS

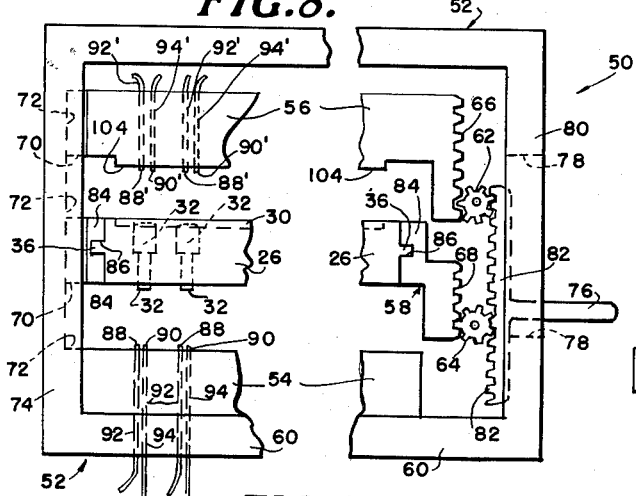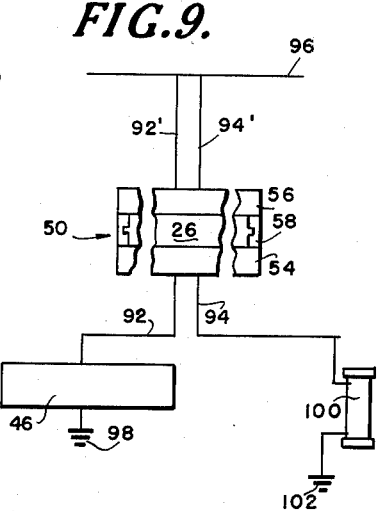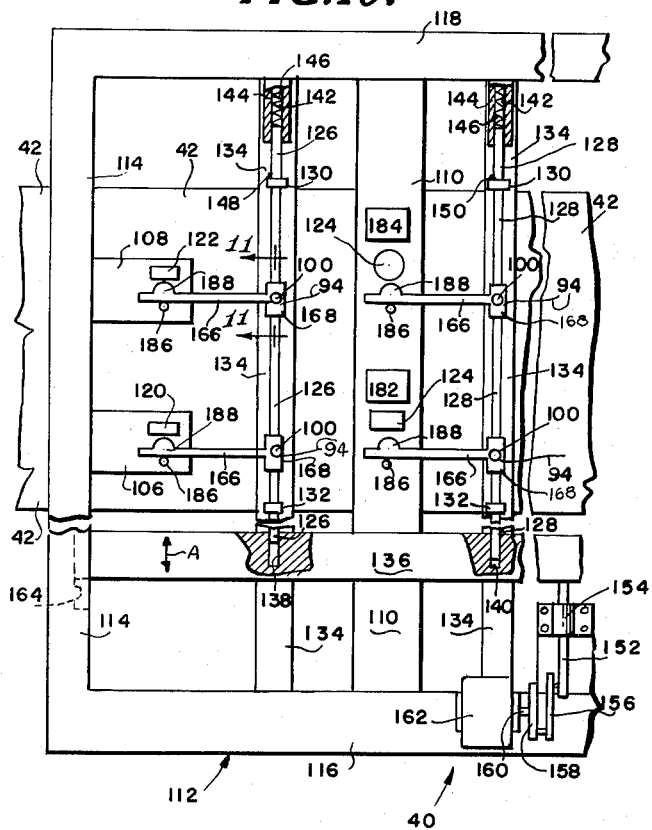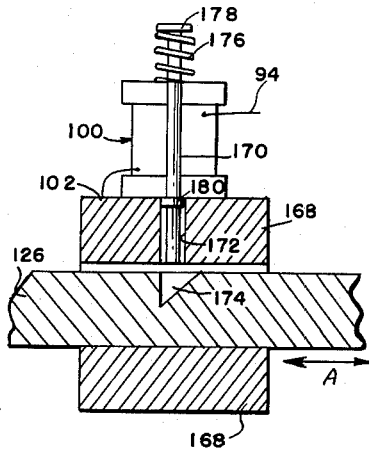

United States Patent Office 2,992,625
Patented July 18, 1961

2,992,625
SYSTEMS AND STRUCTURES FOR STORING AND UTILIZING INFORMATION, DATA, ETC.
Raymond H. Eckenbach, 1320 Jefferson Ave., Falls Church, Va.
Filed Aug. 26, 1958, Ser. No. 757,383
2 Claims. (Cl. 116—136)

This invention relates to systems, structures and combinations whereby information, messages, etc. can be stored for future use, as desired.

The system of this invention has special utility in the field of automatic merchandising or shopping, and for this reason, the invention will be shown and described hereinafter in an exemplary embodiment thereof in this field. It should be understood, however, that the invention is not limited to that particular field inasmuch as novel concepts, structures, techniques and principles embodied therein may also be utilized for other purposes.

An important object of the invention is to design novel and improved structures, arrangements and combinations for the purpose of storing information or orders for future use, as desired, and particularly adapted to provide a workable and commercially acceptable system for automatic shopping or merchandising.

A further object resides in the provision of an automatic shopping system having: novel means for conveniently preparing an order of desired items in the home or some other location removed from the shopping center or stores; and novel means at the store or shopping center for receiving the means containing the prepared order and for transmitting the order to a vending machine adapted to select items of merchandise from a place of storage in accordance with the items preselected by the ordering means.

Another and more specific object resides in the provision of a novel facsimile sheet and peg board structure constituting the aforesaid ordering means. The facsimile sheet is provided with a plurality of pictorial illustrations representing various items of merchandise and holes are provided in the facsimile sheet and peg board whereby pegs may be passed through desired holes in the facsimile sheet for ultimate disposition in the peg board.

A still further and also more specific object resides in the provision of a novel structural arrangement of a peg board control unit for removably mounting the peg board and utilizing the arrangement of pegs therein to operate a vending machine.

Yet another object is to provide a novel vending machine particularly adapted to be utilized in combination with the peg board and peg board control unit and designed to permit the automatic vending of items of merchandise according to the arrangement of pegs in the peg board and irrespective of size and shape variations in the merchandise.

An additional object of the invention is to provide for an overall modernization and simplification of shopping, merchandising or like operations.

Further objects and advantages of the invention will be in part obvious and in part pointed out hereinafter.

The novel features of the invention may be best made clear from the following description and accompanying drawings in which:

FIGURE 1 is a perspective view of a facsimile sheet embodying the invention;

FIGURE 2 is a plan view partially broken out of a peg board and related components embodying the invention;

FIGURE 3 is a side elevational view of the peg board of FIGURE 2;

FIGURE 4 is an enlarged side elevational view of a peg adapted to be used with the facsimile sheet and peg board;

FIGURE 4a is a partial section view taken substantially along the line 4a—4a of FIGURE 2, showing the components in assembled relationship.

FIGURES 5 is a view of a person using the structures shown in FIGURES 1-4;

FIGURE 6 is a fragmentary and perspective view of an exemplary shopping center arrangement illustrating a manner in which orders prepared according to the invention may be handled by attendants or clerks at the shopping center;

FIGURE 7 is a schematic flow diagram of an exemplary arrangement at the shopping center;

FIGURE 8 is a side elevational view of a peg board control unit embodying the invention, and showing the manner of mounting a peg board therein;

FIGURE 9 is a diagrammatic view of the peg board control unit of FIGURE 8 and showing an exemplary wiring diagram for one item of merchandise;

FIGURE 10 is a fragmentary plan view, partially sectioned, of a vending machine embodying the invention; and FIGURE 11 is an enlarged sectional view taken generally along the line 11—11 of FIGURE 10.

According to the invention, there are provided a facsimile sheet or sheets, a peg board, pegs, a peg board control unit and a vending machine, all as will be fully explained hereinafter. These devices are so constructed and arranged that the peg board and facsimile sheet can be used by the housewife or prospective shopper in the home or at any other desired location to enable an order of merchandise or goods to be preselected by an arrangement of pegs in the peg board. The facsimile sheet is used to permit the predetermined arrangement of pegs in the desired locations in the peg board.

The peg board with the pegs disposed in the preselected arrangement therein, may then be taken by the shopper to the food market or shopping center where the peg board control unit and vending machine will be located. The peg board constitutes the shopper's order and is handed to a clerk who then inserts it into the peg board control unit. The peg board control unit operates in accordance with the preselected arrangement of pegs in the peg board to actuate the vending machine whereby the desired items of merchandise will be selected for delivery and packaging, for example, at a pick-up and check-out station.

The food market or shopping center store to be used with the invention may be set up to occupy a minimum of space with an appropriate driveway arrangement or the like so that the shoppers may drive up to a window to deposit their orders and then drive to another part of the store to pick up and pay for the merchandise ordered.

*Facsimile sheet*

The facsimile sheet referred to preferably is in the form of a card formed of any suitable material, such as plastic, cardboard or the like, and is provided with indicia or pictorial illustrations thereon representing items of merchandise or the like. The card includes a predetermined arrangement of holes therein situated in alignment with each of the items represented by the indicia or pictorial illustrations.

Referring to the illustrative embodiment thereof in FIGURE 1, it will be observed that numeral 20 designates a rectangular facsimile sheet, numeral 22 designates the pictorial illustrations representing the items of merchandise, and numeral 24 designates the holes formed in the facsimile sheet. The pictorial illustrations 22 may be applied to the facsimile sheet in any desired manner, such as by printing, and preferably will show labels, brand names, trademarks, etc., as usually appear on corresponding items of merchandise found on store shelves and racks. More than one of each item may be shown on the facsimile sheet 20, and also, more than one hole 24 may be formed through each pictorial illustration of an item of merchandise, in the event it is desired to order more than one of the same item.

The holes 24 in the facsimile sheet will be arranged therein according to a master plan, for a purpose to be apparent as the description proceeds.

In a proposed embodiment, the facsimile sheet is 9" long, 3½" wide and 1/32" thick, being made of acetate, and containing full color pictorial illustrations 22 of about 125 different products. Like items will be grouped together, for example, all canned soups will be positioned adjacent each other, followed perhaps by baby foods, etc. In other words, a color photograph of one long shelving area in a modern food market might be comparable to the pictorial illustrations on the facsimile sheet. If desired, only one of each item of merchandise may appear on the facsimile sheet. In this embodiment, the holes 24 may be about 1/16" in diameter.

Any appropriate number of these facsimile sheets 20 may be utilized depending on the food merchandising system to be set up. For example, 20–30 sheets may be necessary in order to provide for a variety and selection comparable to that in present day supermarkets. If desired, pictorial illustrations 22 may be arranged on both sides of the facsimile sheet with the holes 24 going therethrough in predetermined order.

Peg board and peg

The peg board preferably is also of rectangular outline and made of any suitable electrically insulating or non-conducting material, such as plastic or wood. For example, it may be made of a thermo-setting, synthetic resin, polyethylene, polystyrene or the like.

In the illustrative embodiment of FIGURES 2 and 3, the peg board 26 is slightly larger than the facsimile sheet 20 in length and width, and is provided with a predetermined arrangement of holes 28 therein.

Suitable means are provided whereby the facsimile sheet 20 may be mounted or arranged on the peg board 26. This means and the arrangement of holes in the facsimile sheet or sheets and peg board are so designed that when a facsimile sheet is placed on the peg board, each of the holes in the facsimile sheet will be substantially coaxially aligned with one of the holes in the peg board.

An exemplary form of this means for mounting the facsimile sheet is shown as including a peripheral ridge 30 extending upwardly from one face of the peg board 26 and completely enclosing or circumscribing the holes 28 therein. This peripheral, rectangular ridge 30 is of substantially the same inner dimensions as the length and width of the facsimile sheet 20 so as to receive the sheet therein in superimposed relation to the peg board, with the holes 24 in the facsimile sheet being aligned with corresponding or related holes 28 in the peg board.

The depth of the ridge 30 preferably is approximately equal to the thickness of the sheet 20, while the thickness of the remainder of the peg board 26, in one proposed embodiment, may be approximately ½".

The number of holes 28 in the peg board preferably corresponds to the approximate volume or number of items available in present day food markets. For example, in the proposed embodiment referred to, the board 26 may contain 6,000 holes, the number and arrangement of these holes 28 corresponding to the number and arrangements of the holes or perforations 24 in the facsimile sheets 20. In other words, the number and arrangement of these holes 28 and the holes 24 on the various facsimile sheets 20 that may be used will be such that when any one of the facsimile sheets is placed within the ridge 30 of the peg board, with the items of merchandise illustrated on the facsimile sheet facing upwardly or exposed, each of the holes 24 in the facsimile sheets will be aligned with a hole 28 in the peg board, and each hole 28 represents an item of merchandise. In FIGURE 2, the holes 28 are shown as being arranged in longitudinal rows 27 and transverse files 29, some of the holes being omitted from the drawing for convenience and clarity of illustration. It will be understood that the number and arrangement of holes 28 may be varied, as desired.

The holes 28 are adapted to receive pegs, such as that indicated by numeral 32 in FIGURES 4 and 4a. As shown, the peg 32 is larger at one end than the other to present an intermediate shoulder 34, and the holes 28 are counterbored, as best seen in FIGURE 3, whereby the pegs may be retained therein. Again in the proposed embodiment, the holes 28 may be 1/16" in diameter for 3/8", and a somewhat smaller diameter for the remainder of the thickness of the peg board. The pegs may be of corresponding but slightly smaller dimensions to permit an easy but press fit entry through the facsimile sheet and into the holes in the peg board. As best shown in FIGURE 4a, the peg 32 extends above and below the planar surface of the peg board 26 to facilitate subsequent engagement of the peg 32 in an electric circuit, as will be apparent hereinafter.

In FIGURE 4a, the peg board 26 is shown with the facsimile sheet 20 thereon, and a typical peg 32 being shown in engagement within a hole 28. As is apparent, the hole 24 in the sheet 20 is sufficiently large to receive the top portion of the peg 32. The facsimile sheet may be removed without affecting the position of the pegs 32 in the holes 28.

The pegs 32 will be made of a suitable electrically conductive material, such as metal. These pegs may be manufactured so as to be initially connected together as by plastic to form a conveniently handled rod 32' (see FIGURE 5), the plastic joint between adjacent pegs permitting the shopper to break off pegs after their entry into the peg board. The plastic joint between adjacent, connected pegs in the rod would be of such character as to be easily broken and removed from engagement to the pegs, as desired.

A metal peg 32 present in a hole 28 in the peg board represents the means for closing an electrical circuit in electronic data processing equipment, as will be evident in FIGURE 8. It will thus be appreciated that the peg board may be conveniently used with electronic data processing equipment, with the pegs 32 serving as the media for programming, computing, inventory, scheduling, billing, surveying, polling, and like procedures.

The opposite shorter edges of the peg board 26 are shown as being provided with projections 36. The purpose of these projections will become apparent as the description proceeds.

Layout diagram

FIGURE 7 illustrates, schematically, an exemplary layout at the food market for receiving and filling the orders carried by the peg board. In this layout, numeral 38 indicates the order receiving station, numeral 40 the vending machine, numeral 42 a conveyor passing through the vending machine, numeral 44 a packaging and pick-up station, and numeral 46 an electronic data processing machine. The conveyor 42 may be of any conventional form, such as an endless belt trained around rollers 48 and driven by any appropriate means.

As will be described in more detail hereinbelow, the peg board control unit is located at the order receiving station 38 and will operate when a peg board is placed therein to actuate the vending machine 40 and electronic data processing machine 46, whereby the desired items will be delivered on the conveyor belt 42 to the packaging station 44, and the electronic data processing machine 46 may produce an itemized listing of the goods, with their prices.

Peg board control unit

According to one embodiment of the invention, the peg board control unit preferably includes means for mounting the peg board 26 in a predetermined position, with a plurality of electrical contact points arranged on a pair of spaced members disposed on opposite sides of the peg board mounting means, the electrical contact points on one of said members being arranged in the same order and in alignment with corresponding contact points on the other of said members, and with means for effecting relative movement between said members and the peg board mounting means whereby any pegs in the peg board will be engaged at opposite ends by said contact points. Each pair of aligned contact points in the spaced members preferably are connected in an electric control circuit which will operate the vending machine, as will be described in more detail hereinbelow.

An exemplary construction for the peg board control unit to be used with this invention is illustrated in FIGURES 8 and 9 and identified by numeral 50. As shown in FIGURE 8, this unit may include a generally rectangular outer frame 52 having a bottom member 54, top member 56 and intermediate member 58 mounted therein. The bottom member 54 is shown as being stationarily mounted on the base 60 of the frame, while the members 56, 58 are arranged by suitable means for vertical reciprocatory movement therein. This means is shown as including upper 62 and lower 64 gears suitably mounted in the frame 52 in a stationary vertical position for rotation on horizontal axes and in engagement with racks 66, 68 formed on the sides of the members 56, 58, as indicated. The opposite sides of these members 56, 58 are shown as including a lateral projection 70 slidably disposed in a vertically extending groove 72 formed in the adjacent side 74 of the frame 52. Rotation of the gears 62, 64 may be effected by a handle 76 extending through an opening 78 in the side 80 of the frame 52 and carrying a rack 82 at its inner end in engagement with the gears 62, 64, as indicated.

The intermediate member 58 may be generally U-shaped in plan, for reception of the peg board 26. The distance between the legs 84 of this member 58 is approximately equal to the length of the peg board, and rabbets or grooves 86 are formed in these legs whereby the projections 36 on the peg board may be slidably inserted thereinto, or removed therefrom, as is evident.

The top 56 and bottom 54 members are shown as being provided with a plurality of contact points 88, 90, 88', 90' arranged on the surfaces thereof facing the intermediate member 58. These contact points are arranged in pairs in each member, as shown, and each pair 88, 90 of contact points on the bottom member 54 is in substantial vertical alignment with a corresponding pair of contact points 88', 90' in the top member 56, as is apparent. The number, arrangement and order of these pairs of lower contact points 88, 90 and upper contact points 88', 90' correspond to the number, arrangement and order of the holes 28 in the peg board 26 when the latter is mounted in the intermediate member 58. It will be understood that suitable stop means (not shown) will be provided on legs 84 of the intermediate member 58 to limit the inward movement of the peg board 26 as it is being slidably mounted therein in order to insure proper alignment of the peg board holes 28 with the contact points 88, 88', 90, 90'.

Wires 92, 94 are connected to the contact points 88, 90 in the lower member 54, and extend therethrough for suitable connection respectively to the electronic data processing machine 46 and the vending machine 40, as will be described in more detail hereinbelow. And wires 92', 94' are connected to the contact points 88', 90' in the upper member 56 extending therethrough, and are suitably connected to a source of power. Appropriate electrical insulation will be provided around these wires. If desired, members 54, 56 may be made of a non-conductive material, such as plastic, with the wires 92, 92', 94, 94' embedded therein.

FIGURE 9 illustrates schematically the peg board control unit 50 and one set of wires 92, 94 and 92', 94'. The wires 92', 94' for upper contacts 88', 90' are shown as being connected to a power line 96; while the wires 92, 94 for lower contacts 88, 90 are respectively shown as extending to the processing machine 46, grounded as at 98, and also to a solenoid or electromagnetic relay 100, grounded as at 102. This solenoid 100 operates in the exemplary vending machine construction, and a multitude of such solenoids will be provided, all as will be explained in more detail hereinafter. It will be understood that the other sets of aligned upper and lower pairs of contact points 88, 90, 88', 90' will be electrically connected to the power line 96 and machine 46, and also to other solenoids 100, as will be evident as the description proceeds.

The electronic data processing machine 50, and its associated circuitry including the contact points 88, 88' and wires 92, 92' are not essential to the invention, although as mentioned heretofore, it renders the system more automatic and provides other advantages.

It should be apparent from FIGURE 8 that movement of the handle 76 upwardly will effect counterclockwise rotation of the gears 62, 64 which will in turn cause the members 56, 58 to move downwardly through engagement with the racks 66, 68 and until the members 54, 56, 58 are in engagement with each other so that any pegs 32 in the peg board 26 will be brought into contact with their respective and corresponding contact points 88, 90, 88', 90'. The contact points 88, 90 will be bridged by the bottom of the peg 32 while the upper contact points 88', 90' will be bridged by the top of the peg. Thus, the respective loop for the machine 46 and solenoid 100 will be closed. After the order has been taken off the peg board 26 in this manner, the handle 76 will then be elevated to return the members 56, 58 to the positions thereof shown in FIGURE 8.

The upper member 56 is shown as including a projected area 104 on its lower face which will correspond to the length and width of the area defined within the ridge 30 on the peg board 26 for entry thereinto when the handle 76 is elevated, to assure desired contact between the contact points 88', 90' and the upper end of the pegs. The length of the pegs 32 preferably will be such that they project somewhat from either end of the peg board holes 28 for proper engagement with the contact points, as indicated in FIGURE 8.

Vending machine

In a broad aspect, the vending or merchandise dispensing machine 40 contemplated by the invention includes a plurality of push rods arranged in parallelism, means for mounting merchandise laterally of each rod, with provision being made for reciprocating the push rods in the direction of their longitudinal axes and in different amplitudes with at least one operating arm being loosely mounted on each of the rods and extending laterally therefrom for engagement with merchandise, there further being provided means for selectively and detachably drivingly engaging said arms to their respective rods for reciprocation therewith to dispense the desired items. The main purpose of the different amplitudes of reciprocation for the push rods and the means for selectively engaging the operating arms thereto is to permit dispensing of products which are not uniform in size and shape. The push rods preferably are reciprocated by a master pusher bar and the means for selectively and detachably drivingly engaging the operating arms to their respective rods is controlled by the peg board control unit, as will be explained more fully hereinafter.

An illustrative embodiment of the vending machine 40 is shown in FIGURES 10 and 11. As best seen in FIG- URE 10, the upper fllight of the conveyor belt 42 extends through or under the vending machine and shelves 106, 108, 110 for merchandise are disposed thereabove. These shelves may be supported by any suitable structure, such as the generally rectangular frame 112. Shelves 106, 108 are shown as being connected to and extending outwardly from the side 114 of the frame 112, while the shelf 110 is shown as being connected at either end thereof to the opposite sides 116, 118 of the frame 112. The merchandise on shelf 106 is indicated by numeral 120, the merchandise on shelf 108 is indicated by numeral 122 and the merchandise on shelf 110 is indicated by numeral 124.

Two parallel and transversely extending horizontal push rods 126, 128 are shown as being mounted adjacent the shelves 106, 108, 110. These push rods may be mounted for reciprocation in the direction of their axes by means of bushings 130, 132 carried by narrow supporting platforms 134 connected at either end of the opposite sides 116, 118 of the frame 112, as shown. The rods 126, 128 preferably will be at substantially the same elevation as the adjacent shelves, and the shelves 106, 108, 110 may all be coplanar.

A master pusher bar 136 is shown as being arranged adjacent one end of the rods 126, 128 with blind holes 138, 140 being provided in the leading edge thereof for receiving the ends of the these rods 126, 128, respectively, as shown. Rod 128 is shown as being of a greater length than rod 126, and hence, extends farther into the hole 140 provided therefor in the bar 136. The other ends of the rods 126, 128 are shown as being mounted in a hole 142 in guide elements 144 carried by the side 118 of frame 112, as indicated. Suitable means, such as a compression spring 146, is shown as being arranged in the holes 142 for urging the rods 126, 128 toward the pusher bar 136. Detents 148, 150 are shown as being provided on the rods 126, 128, respectively, for abutment against the bushings 130 to limit the movement of the rods under the bias of the springs 142.

The pusher bar 136 is reciprocated bodily by appropriate means in the direction of the axes of the rods 126, 128 (see arrow A). This means may include a horizontally reciprocating driving arm 152 mounted in a bearing 154, as shown, and driven by a crank arm 156 connected to a fly wheel 158 carried by the output shaft 160 of a prime mover or motor 162. The left hand end of the pusher bar 136 is shown in FIGURE 10 as being slidably disposed in a horizontally extending groove 164 formed in the side 114 of frame 112. The other end of the pusher bar 136 may be similarly mounted in the opposite side of the frame 112 (not shown).

Hence, it will be apparent that as the pusher bar is reciprocated by the motor 162, crank 156 and driving arm 152 in the direction of the arrow A, the inner ends of the blind holes 138, 140 will be brought into engagement with the adjacent ends of the rods 126, 128 to drive them against springs 146 and into the holes 142 in the guide elements 144, the springs 146 effecting the return movement of the rods. Inasmuch as the rod 128 extends farther into its hole 140, and inasmuch as these holes are of substantially equal depth, the amplitude of the reciprocation of rod 128 will be greater than that of the rod 126. The purpose of this will be apparent as the description proceeds.

The rods 126, 128 are provided with an operating arm 166 for each stack of merchandise 120, 122, 124. These operating arms may be of identical construction, and are shown as being joined at their inner ends to a cylindrical portion 168 encircling the rod, and of an inner diameter greater than the diameter of the rods so as to be mounted loosely thereon, as best seen in FIGURE 11. The arms 166 extend generally radially and horizontally from the cylindrical portions 168 and are normally disposed on the adjacent shelf to the rear of the stack of merchandise carried by that shelf, as indicated in FIGURE 10. Normally, the rods 126, 128 will reciprocate freely through the cylindrical portions 168, the latter remaining stationary due to the loose fit on the rods, as indicated in FIGURE 11. However, means are provided for drivingly engaging the cylindrical portions 168 to their respective push rods, when it is desired to dispense merchandise from one or more of the stacks 120, 122, 124. This means is best shown in FIGURE 11 as including one of the solenoids 100 suitably mounted on top of each cylindrical portion 168, and provided with a reciprocating armature 170 normally extending partially through an aligned hole 172 in the cylindrical portion 168, and adapted to enter into a slot or notch 174 formed in the rods 126, 128 immediately therebeneath, as shown. A compression spring 176 is illustrated as abutting against the top of the solenoid 100 and a flange 178 on the armature 170 for continuously urging the armature in an upward direction, while a shoulder 180 is shown on the armature 170 for engagement to the bottom of the solenoid 100 to limit the upward movement thereof, in the manner indicated.

Each of the solenoids 100 mounted on the cylindrical portions 168 for each operating arm 166 will be connected by one of the wires 94 to the peg board control unit, as previously described (see FIGURE 9). The wires 94 adjacent the solenoids will have sufficient slack in them to enable the solenoids 100 to move freely with the operating arm 166 and cylindrical portion 168 when the solenoid has been energized to engage the armature 170 in the slot 174, whereby the operating arm in question will reciprocate with its push rod.

Thus, assuming all or only some of the solenoids 100 on the operating arms 166 shown in FIGURE 10 have been energized through the peg board control unit or a similar device to drivingly connect such with their respective rods 126, 128, for example, in response to the presence of pegs 32 in the peg board 26 corresponding to these solenoids to be energized, such arms 166 will be reciprocated with their push rods to cause an item of merchandise to be moved from the adjacent stack of merchandise off the shelf and onto the conveyor belt. The shelf 110 is shown as being provided with appropriate openings 182, 184 therein whereby the items of merchandise being pushed by the adjacent operating arms will drop onto the conveyor belt, as is evident. On the return movement, the operating arms 166 will engage a detent 186 provided on the shelves to arrest rearward movement at substantially the same time that the detents 148, 150 on the rods 126, 128 engage the bushings 130. At this time, the energized solenoids 100 may be deenergized and the springs 176 will return the armatures 170 to their normal position shown in FIGURE 11. Or, the motor 162 may be deenergized after each complete cycle of reciprocation of bar 136.

The operating arms 166 may be provided with lugs 188 which engage the merchandise and push it off the shelves so that as the stack of merchandise tends to fall or drop into the vacancy created by the item dispensed onto the conveyor, it will rest on the operating arm, and after the arm returns to the retracted position thereof, shown in FIGURE 10, the stack of merchandise will then be free to drop or fall onto the shelf, to place another item in the line of the reciprocatory movement of the adjacent operating arm.

By virtue of the construction and arrangement of the rods 126, 128 in the vending machine, it is possible to selectively dispense desired items of merchandise, irrespective of variations in their sizes and shapes, by the convenient expedient of having the pusher bar 136 reciprocating in a substantially constant amplitude. In other words, as the pusher bar 136 is reciprocated, the merchandise on the stacks 120, 122, 124 will be dispensed or not dispensed, depending on whether or not the solenoid 100 associated with the adjacent operating arm 166 is energized. Hence, merchandise can be dispensed from any one or more of these stacks, in accordance with the positioning of pegs 32 in the peg board 26, irrespective of the configuration and size of the package or container for the merchandise. The different amplitudes of the reciprocatory motion of rods 126, 128 will be utilized for dispensing articles of different size. For example, articles of a larger width or thickness can be dispensed by rod 128 than by rod 126 since the former has a greater amplitude of reciprocation.

It should be evident that although only two rods 126, 128 have been shown, additional push rods may be arranged, as desired, adjacent additional shelves for merchandise, in a manner similar to that described for rods 126, 128 and shelves 106, 108, 110. These additional push rods will be provided with operating arms and solenoids therefor, and be drivingly connected to pusher bar 136 (as described heretofore with reference to rods 126, 128) for reciprocation thereby in amplitudes different from those for rods 126, 128, as will be appreciated. The energization of the solenoids for the operating arms on these additional push rods may again be controlled by the presence or absence of pegs 32 in corresponding holes in the peg board when the latter is used in the peg board control unit 50. By reason of the use of such additional rods, the variety of merchandise that can be dispensed will be greater, as is evident.

Electronic processing equipment

The electronic processing machine 46, shown in FIGURES 7 and 9, may be of any appropriate design and construction capable of producing certain types of desired information in accordance with the positioning and arrangement of the pegs in the peg board, when the latter is utilized in the peg board control unit. For example, this machine may prepare the following information:

(1) A detailed, individual shopping list for each customer identifying all the items of merchandise ordered, by name, if desired, and together with the cost of each item plus the sum total.

(2) A financial statement consistent with inventory received, inventory sold, overhead, known depreciation, etc.

(3) A detailed vendor shopping list to be transmitted by appropriate means to a supply point, the list including the name and amount of the items needed, the date required, and a loading pattern.

An electronic processing machine, of the above type and capable of performing the functions referred to, may be of any of the conventional types presently being manufactured by such companies as International Business Machine and Remington Rand. It should be noted that the electrtonic processing machine is not an essential part of the invention, and may be omitted, if desired.

General procedure and operation

In using the invention, the shopper will scan a booklet or catalog (not shown) containing the various items that may be desired. For example, as previously indicated, the system of the invention may be designed for the merchandising of 6,000 different items which may be pictorially illustrated on a plurality, such as 40, of the facsimile sheets 20. These facsimile sheets preferably are appropriately arranged so as to comprise the booklet or catalog. When the shopper locates the item desired, the facsimile sheet bearing the same is superimposed on the peg board 26 and a peg 32 from rod 32' is passed through the perforation or hole 24 for that particular item or product, and into the aligned hole 28 in the peg board, as indicated in FIGURE 5. This operation will be repeated for each item desired.

The peg board 26, together with the pegs 32 lodged therein in the holes 28 corresponding to the preselected items of merchandise, will then be delivered to the food market or shopping center. (As previously indicated, the pegs 32 may be of such size as to be held by friction in their holes 28.) FIGURE 6 illustrates a food market 190 and driveway arrangement 192 whereby the shopper may drive to the window 194 corresponding to the order receiving station, and hand the peg board to a clerk, who in turn will place the peg board in the peg board control unit 50 and effect operation of the handle 76 thereof, either manually or by automatic means, whereby the vending or dispensing machine 40 will be actuated to dispense the various items, selected by the arrangement of pegs 32 in the peg board, onto the conveyor belt 42 for delivery to the pick-up station 44 where another clerk may handle the paying and other transactions for completion of the order.

It should be evident from the foregoing description that when handle 76 is actuated to bring the peg board 26 into engagement with the members 54, 56, each peg in the board 26 will engage the corresponding set of contact points 88, 90, 88', 90' to thereby energize the corresponding solenoid 100 and to indicate in the electronic machine 46 the item of merchandise being dispensed by reason of the energization of that particular solenoid.

Following the insertion of the peg board in the control unit 50 and the closing of the contact points therein, the clerk may then actuate two switches, one to initiate operation of the prime mover 162 for one complete cycle of reciprocation of the pusher bar 136, and the other to start the electronic data processing machine 46. After the vending machine switch is closed, the push rods 126, 128 will be moved through only one cycle of reciprocation so that the energized solenoids 100 will effect depositing of the ordered items on the belt 42. The vending machine will then be inactive until the next order is ready to be taken.

When using an electronic processing machine of the type previously described, the clerk at the order receiving window 194 may be provided with the itemized list containing the names of the products or items ordered, their cost, and a sum total, shortly after the peg board has been placed into the peg board control unit. While this and the paying transaction are taking place at the window 194, the vending machine 46 will be dispensing the merchandise, and when this latter operation is completed, the peg board, with the pegs removed, will be returned to the shopper. Either before or after the paying transaction, the various items of merchandise which have been ordered will be gathered, packaged and delivered to the shopper, such as at the station 44.

The advantages of the system of this invention to the shopper and vendor will be apparent. The time and inconvenience involved in shopping by the so-called "self-service" system in present day supermarkets will be eliminated. Such operations as handling and computing each item at a check-out stand, handling carts, the entire chain of paperwork operations, assisting the shopper both by carrying packages to a car or operating a pick-up line, will also be eliminated. Furthermore, it will not be necessary for the vendor to replenish stock in the usual fashion. This may be accomplished either by a listing from the electronic data processing machine, or by peg board whereby each hole in the peg board will represent a predetermined amount of a particular item and the peg board with the pegs in the desired holes therein will be delivered to the supplier for use, for example, in connection with a peg board control unit and dispensing machine such as those described heretofore.

The present invention will thus be seen to completely and effectively accomplish the objects enumerated hereinabove. It will be realized, however, that various changes and substitutions may be made to the specific embodiments disclosed therein for the purpose of illustrating the principles of this invention, without departing from these principles. Therefore, this invention includes all modifications encompassed within the spirit and scope of the following claims.

I claim:
1. The device of the character described comprising: a peg board having upper and lower sides, and formed with a predetermined arrangement of holes passing completely through said peg board, each of said holes having a bore communicating with the lower side of said peg board and a counterbore of larger size than said bore communicating with the upper side of said peg board; an electrically conducting peg including a head portion and a stem portion, said head portion cooperatively engageable with the counterbore and said stem portion cooperatively engageable with the bore of the hole, said peg being of sufficient length to extend beyond the upper and lower sides of said peg board whereby the ends of said peg are engageable in an electric circuit.

2. The device as described in claim 1 further including a card disposed in co-extensive relationship with the upper side of said peg board, said card having holes therein in alignment with the holes of said peg board, the holes in said card being at least as large as the holes in the upper side of said peg board.

References Cited in the file of this patent

UNITED STATES PATENTS

| | | |
|---|---|---|
| 871,384 | Anderson | Nov. 19, 1907 |
| 1,627,993 | Pedersen | May 10, 1927 |
| 1,684,394 | Maase | Sept. 18, 1928 |
| 2,041,589 | Bowers | May 19, 1936 |
| 2,073,904 | Osteen | Mar. 16, 1937 |
| 2,353,002 | Armbruster | July 4, 1944 |
| 2,431,380 | Elliott | Nov. 25, 1947 |
| 2,431,381 | Elliott | Nov. 25, 1947 |
| 2,446,643 | Farmer | Aug. 10, 1948 |
| 2,458,858 | Kelly et al. | Jan. 11, 1949 |
| 2,527,471 | Von Losberg et al. | Oct. 24, 1950 |
| 2,847,146 | Obourn | Aug. 12, 1958 |

FOREIGN PATENTS

| | | |
|---|---|---|
| 940,893 | France | June 14, 1948 |
| 642,048 | Great Britain | Aug. 23, 1950 |